April 17, 1962 A. J. DESSLER 3,030,571
METHOD AND APPARATUS FOR DETECTING MAGNETIC FIELD GRADIENTS
Filed Jan. 8, 1957 3 Sheets-Sheet 1
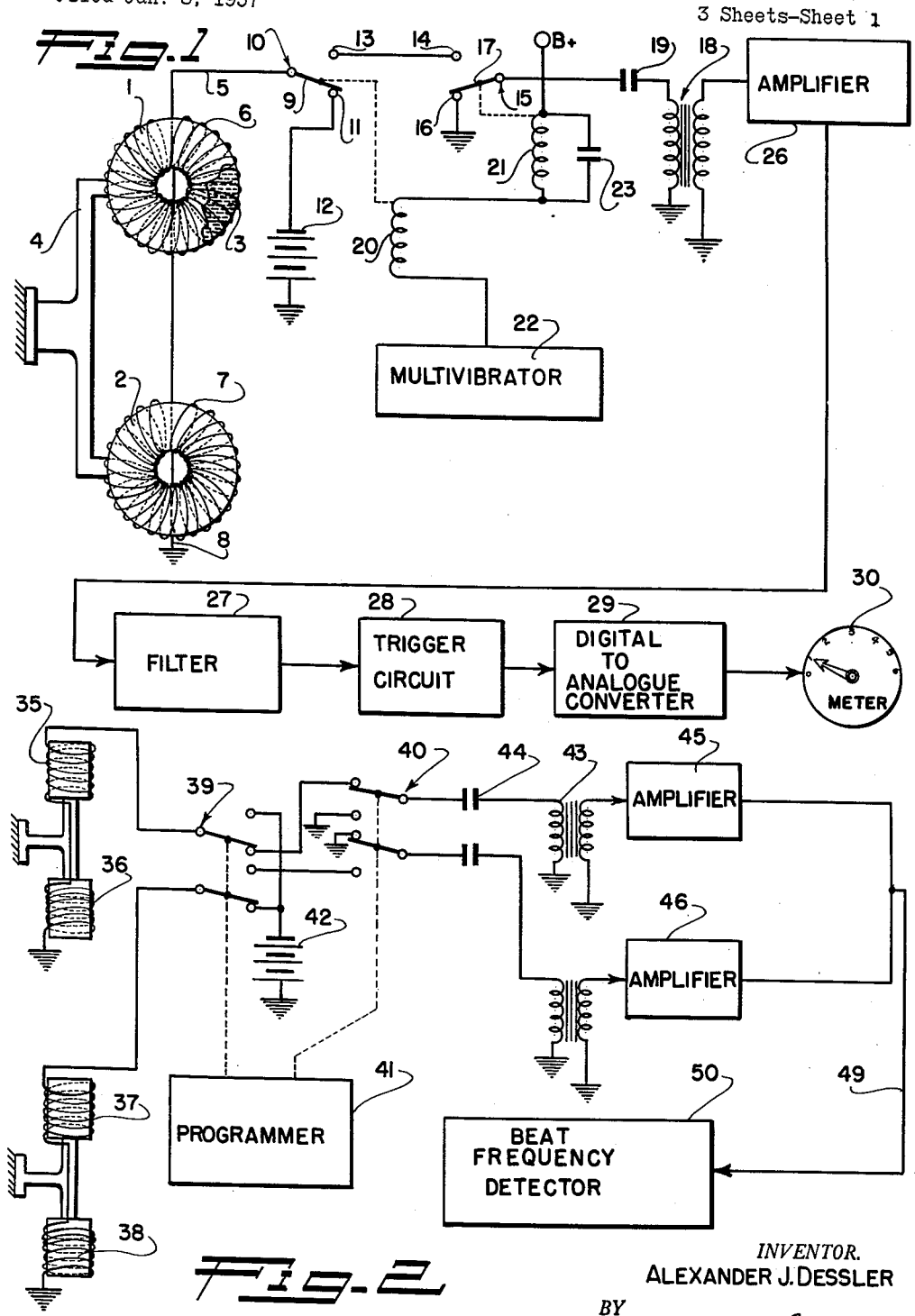
INVENTOR.
ALEXANDER J. DESSLER
BY
George Sullivan
Agent

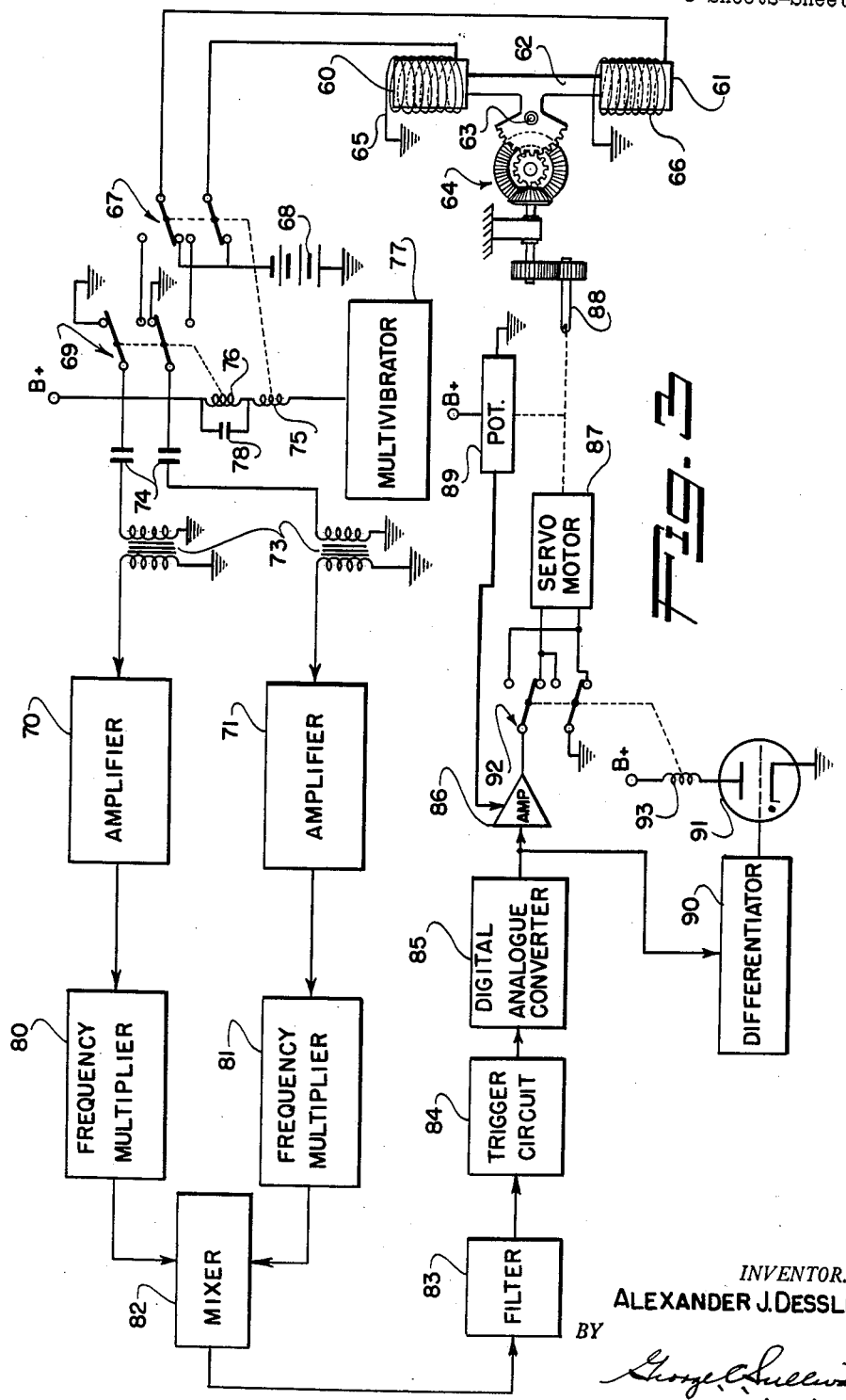

April 17, 1962 A. J. DESSLER 3,030,571
METHOD AND APPARATUS FOR DETECTING MAGNETIC FIELD GRADIENTS
Filed Jan. 8, 1957 3 Sheets-Sheet 3
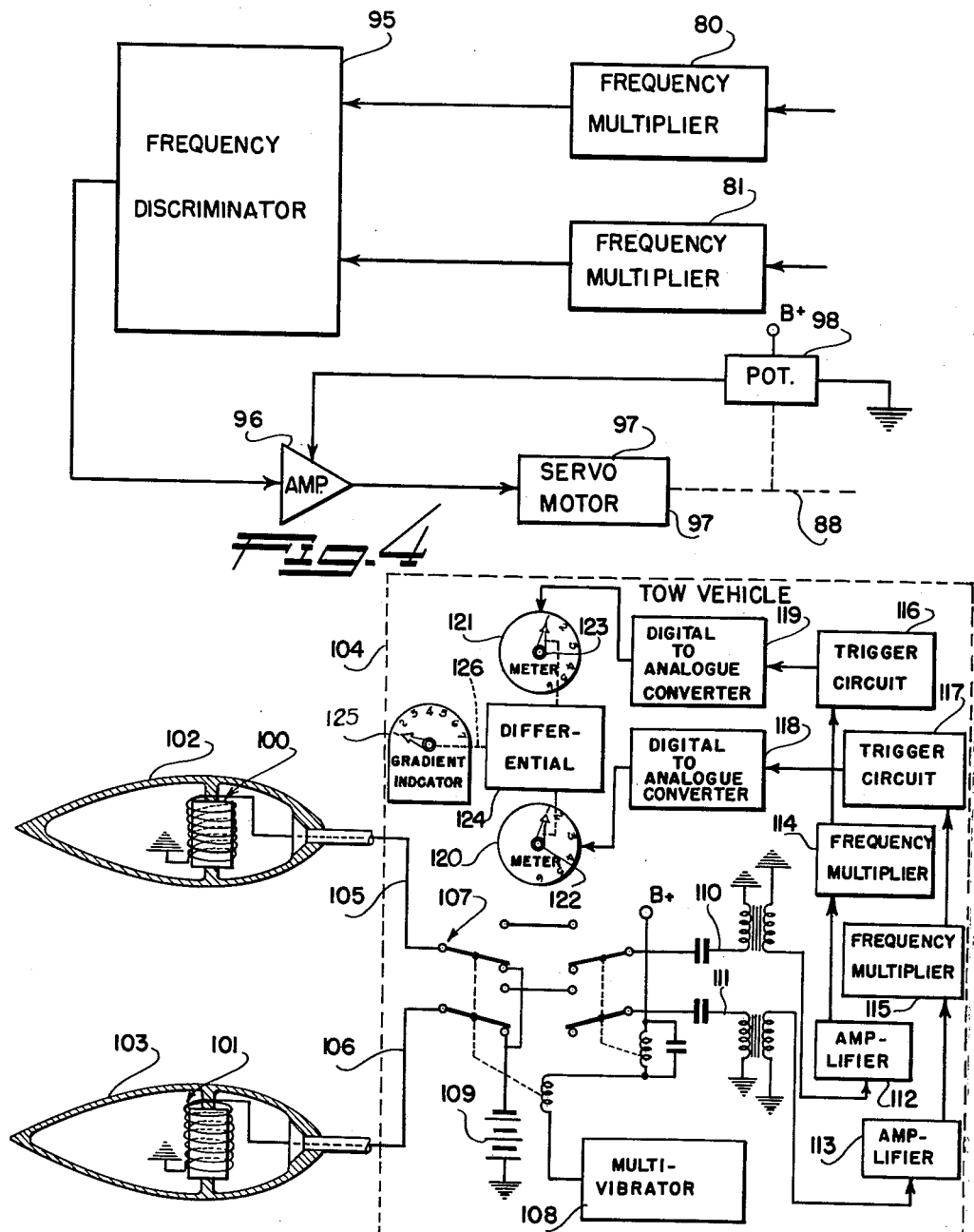
INVENTOR.
ALEXANDER J. DESSLER
BY
Agent 3,030,571
METHOD AND APPARATUS FOR DETECTING
MAGNETIC FIELD GRADIENTS
Alexander Jack Dessler, Palo Alto, Calif., assignor to
Lockheed Aircraft Corporation, Burbank, Calif.
Filed Jan. 8, 1957, Ser. No. 633,098
14 Claims. (Cl. 324—.5)

This invention relates generally to devices for measuring magnetic field strength and more particularly to a method and apparatus for the detection of inhomogeneities in the earth's magnetic field. The method and apparatus is useful in such applications as magnetic field prospecting and the detection of remote ferromagnetic objects. When used with suitable auxiliary apparatus the device will indicate direction of a magnetic body and hence it is useful as a magnetic homing device for torpedoes and the like.

The method and apparatus described herein utilizes the fundamental properties of the atomic spin system in detecting magnetic field gradients. A substance such as benzene, water or helium $^3$ having a large number of signal nuclei per unit volume and a suitably long phase memory time $T_2$ is polarized to precess about the earth's magnetic field in such a way that the magnetic moment of the nuclei will induce a signal voltage in a coil. The frequency of precession of the nuclei is directly proportional to the strength of the earth's magnetic field. Therefore, the frequency of the signal induced in the coil may be operated on to provide an indication of magnetic field strength. By utilizing two separate masses of the substance to produce two separate signals, a beat note may be obtained by mixing the signals as described herein to indicate both the presence of a magnetic field gradient and the magnitude of that gradient.

Any ferromagnetic object will distort the earth's magnetic field in such a manner as to produce a field gradient in the vicinity of the object. If the magnetic field gradient detector apparatus is brought into the vicinity of the ferromagnetic object so that there is a gradient between the two masses, the beat note from the detector will indicate the presence of the ferromagnetic object. The frequency of the beat note will vary with the cosine of the angle formed by a line drawn through the two masses and a line drawn from the mid-point between the two masses to the ferromagnetic object. This variation of beat note frequency with angle permits using the magnetic field gradient detector as a magnetic homing device.

An object of this invention is to provide a method and apparatus for measuring magnetic field gradients utilizing the fundamental properties of nuclei or electrons in the atomic spin system of matter.

Another object of this invention is to provide method and apparatus for measuring the magnetic field gradient which is insensitive to vibration and changes in temperature and which will remain in calibration for accurately measuring magnetic field gradients of the order of 0.1 ($10^{-6}$ gauss) or more.

Another object of this invention is to provide a method and apparatus for measuring a magnetic field gradient directly rather than as a change in total field as do present magnetometers whereby the operation of the apparatus is independent of fluctuations of the earth's general field.

Still another object of this invention is to provide apparatus for measuring a magnetic field gradient which is more simple and lighter in weight than presently available equipment for performing the same function.

Further and other objects will become apparent from a reading of the following description especially when considered in combination with the accompanying drawing wherein like numerals refer to like parts.

In the drawing:
FIGURE 1 is a schematic block diagram showing one form of the magnetic field gradient detector;
FIGURE 2 is a schematic block diagram showing a second form of the magnetic field gradient detector;
FIGURE 3 is a schematic block diagram showing the third form of the magnetic field gradient detector for use as a guidance device;
FIGURE 4 is a schematic block diagram showing a modification for the FIGURE 3 device;
FIGURE 5 is a schematic block diagram showing still another form of the magnetic field gradient detector.

Referring to the apparatus configuration of FIGURE 1, the magnetic field gradient detector includes a pair of annular containers 1 and 2 which are filled with a substance 3 such as benzene, water or liquid helium $^3$ (a helium isotope) having a large number of signal nuclei per unit volume and a phase memory time $T_2$ preferably greater than 0.1 seconds. Containers 1 and 2 should be substantially the same size and constructed of a dielectric material, such as, Lucite, although a non-magnetic conductor material which is separated by insulating strips of dielectric material to avoid making a continuous electrical circuit around the container would be satisfactory. A suitable frame 4 is provided for supporting containers 1 and 2 in a spaced relationship. A wire 5 is wrapped around each container 1 and 2 forming induction coils 6 and 7 which are connected in series. One end 8 of wire 5 is grounded and the opposite end is coupled to an arm 9 of a single pole-single throw switch 10. Contact 11 of switch 10 is connected to a suitable source of electrical potential such as battery 12. Switch contact 13 is connected to a contact 14 on a second single pole-single throw switch 15. The other contact 16 of switch 15 is coupled to ground while the arm 17 is electrically connected to an input transformer 18 through a tuning capacitor 19 which is used to tune the coil and transformer inductance to the precessional frequency. Switch 10 is actuated by relay coil 20 and switch 15 is actuated by relay coil 21. Both relay coils are connected in series and coupled to the plate circuit of a multivibrator 22. The function of multivibrator 22 is to effect actuation of switches 10 and 15 at predetermined time intervals. A capacitor 23 is connected in parallel with relay coil 21 to delay actuation of switch 15 with respect to switch 10 and thereby avoid transient voltage surges at input transformer 18 when switch 10 is moved from contact 11 to contact 13. By the use of a slow relay which required approximately one hundredth of a second or more for actuation, only one relay switch would be necessary. Also, a multivibrator is but one way of performing the switching function.

With switches 10 and 15 in their positions shown in FIGURE 1, a polarizing voltage from battery 12 is applied across coils 6 and 7. The current due to this polarizing voltage sets up a magnetic field inside the coils which orient the magnetic moment of the signal nuclei in the substance stored in containers 1 and 2 along the axis of the coil. After a predetermined time $T_1$ required to polarize the signal nuclei has elapsed, multivibrator 22 actuates switches 10 and 15 through relay coils 20 and 21 to disconnect the coils 6 and 7 from the polarizing voltage and connect them to the input transformer 18. If the planes of coils 6 and 7 are oriented perpendicular to the earth's magnetic field the nuclei will precess about the earth's magnetic field in such a way that the net magnetic moment of the nuclei will induce a voltage in each of the coils. By employing annular shaped containers 1 and 2 at least a part of coils 6 and 7 will at all times be oriented perpendicular to the earth's magnetic field, thus eliminating the problem of stabilizing them in a moving vehicle. With the worst possible orientation the signal strength from the annular shaped assembly comprising containers 1 and 2 and coils 6 and 7 will be one-half the signal strength when the container is in the best possible orientation.

The frequency of precession of the nuclei is directly proportional to the strength of the earth's magnetic field. Therefore, if coil 6 is in a slightly stronger or weaker field than coil 7 the frequency of the voltage induced in coil 6 will be slightly different from the frequency of the voltage induced in coil 7. With arms 9 and 17 of relay switches 10 and 15 respectively engaging contacts 13 and 14, the signals picked up by coils 6 and 7 are applied to input transformer 18. By coupling input transformer 18 to an amplifier 26, the amplitude of the two combined signals may be suitably increased for detecting a beat frequency signal representing the magnetic field gradient. The output of amplifier 26 is fed to a suitable filter circuit 27 and the beat frequency is extracted from the complex signal for driving a trigger circuit 28 such as a Schmidt trigger which will indicate zero crossings by generating pulses at each cycle of the beat frequency. These pulses may be applied to a digital to analogue converter 29 to produce a direct current voltage proportional to the number of pulses per second from the trigger circuit. By connecting a galvanometer 30 to the output of the digital to analogue converter, a direct reading measurement of the magnetic field gradient may be obtained.

The filter, trigger circuit, digital to analogue converter and galvanometer in combination serve as a beat frequency detector. There are a number of other ways of determining the beat frequency which will be readily apparent to those skilled in the art and it should be understood that use of the beat frequency detector term is intended to include all of these various ways. For example, the beat frequency may be readily determined with an oscilloscope. The specific circuit described for performing the beat frequency detection function is merely for purposes of illustration.

The frequency at which switches 10 and 15 should be actuated depends upon the type of substance employed within containers 1 and 2 to produce the beat frequency signals. The polarizing voltage must be coupled to coils 6 and 7 for a time $T_1$ sufficient to polarize the nuclei, while the beat frequency detector should be coupled to coils 6 and 7 for a time $T_2$ (properly referred to as the phase memory time of the substance) in which the nuclei will remain polarized to precess about the earth's magnetic field and induce a voltage in the coils. The period $T_2$ must obviously be adequate to allow the beat frequency detector to measure the gradient and the time $T_1$ should be as close to the time $T_2$ as possible. $T_2$ should preferably be greater than one second though periods of the order of 0.1 second would be satisfactory in many cases. There are a number of substances which will meet these requirements. Liquids containing hydrogen in its molecular structure such as benzene, oil or water are in general considered most suitable although liquid helium³ or even solid helium³ are entirely satisfactory and in some applications even preferable. Accordingly, this invention is not restricted to the use of any specific substance. In fact, by using the principle of "Optical Pumping" (see "Orientation and Alignment of Sodium Atoms by Means of Polarized Resonance Radiation," W. B. Hawkins, Physical Review 98, 478 (1955)), the active substance could be sodium vapor whose electrons have been polarized by the light from a sodium vapor lamp instead of nuclei being polarized by a current as shown in FIGURE 1. In this case, the net magnetic moment of the precessing electrons would be detected. Thus, this invention is not restricted to the use of nuclei but may use any atomic spin system which may be polarized. It is the magnetic moment of the atoms which are useful in measuring the magnetic field gradient. Since an atom with a magnetic moment also has an angular momentum, an assembly of these atoms will behave like a magnetized gyroscope in a magnetic field.

When continuous readings are desirable, such as when used for magnetic field prospecting or submarine detection, two pairs of coil and container assemblies 35, 36 and 37, 38 may be used in an arrangement as shown in FIGURE 2 so that when a polarizing voltage is being applied to the substance in one of the pair of containers, the beat frequency detector may operate on the signal produced by the substance in the other pair of containers. The coil and container assemblies 35, 36 and 37, 38 are preferably annular as previously described in connection with FIGURE 1, however they may be of any desired shape such as cylindrical as illustrated. When a container shape other than annular is employed it may of course be necessary to stabilize the containers so that the substance carried therein is polarized in a direction generally perpendicular to the earth's magnetic field. Also, when a coil and container configuration is used which does not cancel the external magnetic field from the polarizing current as the annular shape does, coil and container assemblies 35 and 36 must be kept far enough away from coil and container assemblies 37 and 38 so that the magnetic polarizing field from one set of coils will not influence the readings given by the other set of coils.

In the FIGURE 2 arrangement the containers should be substantially the same size and the containers in each pair should be spaced equal distances apart so that the beat frequency produced will be substantially identical from both under the same magnetic field gradient.

In the FIGURE 2 configuration two switching circuits, one for each pair of coil and container assemblies 35, 36 and 37, 38 is employed, requiring the use of double pole-single throw switches 39 and 40 instead of the single pole-single throw switches 10 and 15 in the FIGURE 1 apparatus. A programmer 41 such as a multivibrator-relay combination as previously described is used to actuate switches 39 and 40 periodically. The switching action alternately connects each pair of the coil and container assemblies with battery 42 while the other pair of coil and container assemblies is coupled to its respective input transformer 43 through a tuning capacitor 44. Input transformers 43, one for each pair of coil and container assemblies, are each coupled to individual amplifiers 45 and 46. The outputs of amplifiers 45 and 46 are fed through a common lead 49 to a beat frequency detector 50 to provide a beat frequency measurement indicating magnetic field gradient. The beat frequency detector may be the same as that described for FIGURE 1 with the exception that in the FIGURE 2 arrangement the device is adapted to receive frequency signals substantially continuously from one or the other of the pair of coil and container assemblies. Thus, the time $T_1$ required to polarize the substance in the containers and the phase memory time $T_2$ in which the substance will remain polarized for imparting the signal to the coil by induction becomes much less critical with only a slight increase in complexity of the apparatus.

A modification of the magnetic field gradient detector for use as a magnetic homing device is illustrated in FIGURE 3 wherein a pair of containers 60 and 61 filled with a suitable substance such as water for example are secured to a frame 62 which is movable about an axis defined by pin 63 in a controlled manner through a gear train 64. Frame 62 holds containers 60 and 61 fixed relative to each other while being spaced apart in generally parallel alignment. Coils 65 and 66 wrapped around containers 60 and 61 respectively are grounded at one end and coupled at the other end to a double pole-single throw switch 67 forming two separate circuits one for each coil and container assembly. In one position of switch 67 a circuit is completed between coils 65 and 66 and a suitable source of electrical potential such battery 68. In the other position of switch 67 a circuit is completed to a second double pole-single throw switch 69 which connects coils 65 and 66 with amplifiers 70 and 71 respectively through input transformers 73 and tuning capacitors 74. Both switches 67 and 69 may be relay actuated through coils 75 and 76 respectively as directed by a programming device such as multivibrator 77. A capacitor 78 is coupled across relay coil 76 to delay the actuation of switch 69 with respect to switch 67 and thereby avoid applying a transient voltage to amplifiers 70 and 71. The amplified output from coils 65 and 66 may be applied to frequency multipliers 80 and 81 to increase the beat note frequency and thereby increase the speed of gradient detection (the speed of gradient detection may be defined as the time required to detect the beat frequency). The frequency multiplier outputs are combined in a mixer 82 to provide a beat frequency, indicating a magnetic field gradient. The beat frequency is extracted from the complex signal at the output of mixer 82 through the use of a filter 83. The beat frequency signal is then applied to a trigger circuit 84 for driving a digital to analogue converter 85 in the same manner as described hereinabove in connection with FIGURE 1.

Since any ferromagnetic object will distort the earth's magnetic field in a manner to produce a field gradient in the vicinity of the object which varies radially outwardly therefrom, the beat frequency signal will represent the aiming error of coils 65 and 66. Therefore, by controlling the position of the coil and container assemblies secured to frame 62 so that the beat frequency is zero, the apparatus may be used as a magnetic homing device.

There are a variety of techniques readily apparent to those skilled in the art for controllably moving frame 62 to zero the beat frequency signal. One possible technique shown by way of example in FIGURE 3 is to drive a servo-amplifier 86 with the digital to analogue converter output to control the operation of a servo-motor 87 which is mechanically coupled to gear train 64 through shaft 88. A feedback loop for the servo-system is completed by mechanically coupling a potentiometer 89 to the servo-motor output shaft 88 to provide the necessary feedback voltage to amplifier 86.

To provide directional sensitivity to the servo-drive mechanism a differentiator 90 may be employed to detect the rate of change of the output signal from the digital to analogue converter 85. When the rate of change exceeds a predetermined level the voltage output from differentiator 90 causes a thyratron 91 to fire and actuate a double pole-single throw relay switch 92 through relay coil 93 located in the thyratron plate circuit. This switching action determines the polarity of the servo-motor input voltage, thus controlling the direction of rotation of the servo-motor output shaft 88.

Since the digital to analogue converter output is capable of indicating the magnitude of an error but not the direction of the error the differentiator and thyratron relay circuit are necessary in the particular servo-drive mechanism shown. Without use of the polarity reversing relay switch 92, the control voltage from the digital to analogue converter will always cause the servo-drive mechanism to rotate frame 62 in the same direction about pin 63 even though the direction of movement of frame 62 should be in the opposite direction to zero the error. This will result in increasing the error signal at an abnormally high rate and when this rate of increase reaches a predetermined level as detected by differentiator 90, thyratron 91 fires to actuate relay control switch 92 reversing the polarity of the servo-motor control voltage and causing frame 62 to rotate in the proper direction for zeroing the error signal. A certain amount of hunting will thus be inherent in the system, however, this would in many cases not be objectionable and accordingly it is disclosed as a rather simple modification to the basic apparatus making it suitable as a homing device.

A phase sensitive type of servo-drive mechanism for the circuit of FIGURE 3 is illustrated in FIGURE 4 wherein the outputs from the frequency multipliers 80 and 81 are applied to a frequency discriminator 95 to provide an output signal, the amplitude of which is proportional to the frequency difference between the input signals and the phase of which is dependent upon which of the input signals is at the higher frequency. Frequency discriminators capable of performing this function are well known in the art and accordingly this component is shown herein only in block diagram form. The output signal from the frequency discriminator is applied to a feedback amplifier 96 for driving a servo-motor 97 coupled to shaft 88 for controlling the movement of the coil and container assembly frame 62. A feedback circuit for the servo-motor is provided by potentiometer 98 which is driven from shaft 88. With the FIGURE 4 modification to the magnetic homing device of FIGURE 3 a more stable and responsive system is obtainable.

FIGURE 5 shows still another modification wherein the coil and container assemblies 100 and 101 are mounted in separate streamlined bodies 102 and 103 respectively for being towed behind a tow-vehicle 104 such as an aircraft or ship to perform a search function in detecting the presence of unknown foreign magnetic objects by measuring the magnetic field gradient. The output leads 105 and 106 from the coil and container assemblies 100 and 101 are fed into vehicle 104 and connect with a double pole-single throw switching circuit 107 which is actuated by a programmer such as multivibrator 108 to alternately switch the electrical circuit of the coil and core assemblies from battery 109 to the signal output circuit as represented by leads 110 and 111. In the output circuit the signals from coil and container assemblies 100 and 101 are first applied to individual amplifiers 112 and 113. The amplified signals are then fed to frequency multipliers 114 and 115 for increasing the speed of gradient detection by increasing the frequency of the signals from the coil and container assemblies 100 and 101. The frequency multiplier outputs drive separate trigger circuits 116 and 117 to generate a number of pulses per second which represent the multiplied frequency of the signal detected by the associated coil and container assembly. The pulse output from trigger circuits 116 and 117 are applied to digital to analogue converters 118 and 119 to provide a direct current voltage proportional to the number of input pulses per second. These direct current voltages drive galvanometers 120 and 121 to indicate the magnetic field strength at coil and container assemblies 100 and 101 respectively. To measure the gradient between the two magnetic fields the galvanometer output shafts 122 and 123 may be mechanically coupled to a differential 124 for driving a gradient indicator 125 through the differential output shaft 126.

By frequency multiplying the amplified signals generated by the coil and container assemblies 100 and 101 a greater number of pulses per unit time are available at the digital to analog converters than would be available without frequency multiplication. This produces a dependable gradient measurement more quickly than if frequency multiplication were not utilized for the simple reason that the trigger circuits driving the digital to analog converters are actuated more often.

The several modifications and uses for the magnetic field gradient detector shown and described herein are only exemplary of the possible modifications and uses for the method and apparatus. While the detail construction features of the apparatus may vary depending upon specific design requirements, the method and operation will be basically the same in all cases. That is, the programmer which may include a multivibrator or other suitable actuating device connects a polarizing voltage across the coils of the coil and container assemblies to set up a magnetic field which orients the magnetic moments of the nuclei in the substance within the containers along the axis of the coil. The programmer then disconnects the coils from the polarizing voltage and completes a circuit between the coils and amplifier means through the switching circuit. The nuclei of the substance in the containers in precessing about the earth's magnetic field induces a signal in each of the coils the frequency of which is directly proportional to the strength of the earth's magnetic field at each coil. By comparing these frequencies as described, the magnetic field gradient may be most accurately measured.

There is no optimum size for the liquid containers. The larger they are the better the signal to noise ratio will be. The size of the container will therefore be determined in a particular design by the required signal to noise ratio. Using water in an annular container having a cross-sectional diameter of approximately 2½" with an outside diameter of approximately 7" and a hole diameter of approximately 2", a signal to noise ratio of approximately 200 to 1 is obtained.

The distance between the core and container assemblies will affect the over-all sensitivity of the device. A spacing of as much as 1,000 feet between the two coils and container assemblies would probably provide maximum sensitivity, however, in a great many applications a spacing of three or four feet would be entirely adequate inasmuch as the apparatus is capable of detecting a gradient as small as 0.1 ($10^{-6}$ gauss).

The specific circuitry is shown and described herein for purposes of illustration rather than limitation. Components such as the programmer and beat frequency detector as well as the polarizing means itself may take many forms within the teachings of this invention. Also, the use of certain components such as the frequency multiplier are optional. Accordingly, it should be understood that many alterations, modifications and substitutions may be made to the instant disclosure without departing from the scope of this invention as defined by the appended claims.

I claim:

1. A device for detecting magnetic field gradients comprising, a pair of spaced masses of a substance having a large number of signal nuclei per unit volume and a phase memory time greater than 0.1 second, a pair of coils one surrounding each mass, a source of electrical potential, a beat frequency detector, and switch means alternately connecting said coils with said source of electrical potential and said beat frequency detector whereby the signal nuclei are polarized by the source of electrical potential to produce free nuclear energy inducing a voltage in each of said coils for detection by said beat frequency detector to indicate a magnetic field gradient.

2. A device as set forth in claim 1 including a programmer automatically actuating said switch means at predetermined time intervals.

3. A device as set forth in claim 1 including frequency multiplier means interposed in the electrical circuit between said switch means and said beat frequency detector.

4. A device as set forth in claim 1 including a programmer automatically activating said switch means at predetermined time intervals, and frequency multiplier means interposed in the electrical circuit between said switch means and said beat frequency detector.

5. A device for detecting magnetic field gradients comprising, a frame, an annular shaped container secured to said frame, a second container of substantially the same size and shape secured to said frame and spaced from the first mentioned container, a substance having a large number of signal nuclei per unit volume and a phase memory time greater than 0.1 second substantially filling said containers, a coil wound concentrically around each container, a voltage source, a beat frequency detector, and switch means alternately connecting the coils with said source of electrical potential and said beat frequency detector whereby the signal nuclei are polarized by the source of electrical potential to the produce a net magnetic moment which will then precess about the earth's magnetic field and induce a voltage in said coils for detection by said beat frequency detector to indicate a magnetic field gradient.

6. A device as set forth in claim 5 including a programmer automatically actuating said switch means at predetermined time intervals.

7. A device as set forth in claim 5 including frequency multiplier means interposed in the electrical circuit between said switch means and said beat frequency detector.

8. A device as set forth in claim 5 including a programmer automatically actuating said switch means at predetermined time intervals, and frequency multiplier means interposed in the electrical circuit between said switch means and said beat frequency detector.

9. A device for detecting magnetic field gradients comprising, a frame, a pair of dielectric containers of substantially the same size and shape secured to said frame, said containers being spaced apart, a substance having a large number of signal nuclei per unit volume substantially filling each container, a pair of coils one wound around each container and connected in series, switch means connecting with said coils, a source of electrical potential connecting with said switch means for selectively applying a polarizing voltage to said substance through said coils whereby at least a part of the magnetic moments of the signal nuclei are oriented transversely of the earth's magnetic field to cause precession of the nuclei, and a beat frequency detector selectively connecting with said coils through said switch means for receiving signals induced into the coils by precession of the nuclei and frequency comparing the signals to provide an indication of a magnetic field gradient.

10. A device for detecting a magnetic field gradient comprising, a frame, a pair of dielectric containers of substantially the same size and shape secured to said frame, said containers being spaced apart, a substance having a large number of signal nuclei per unit volume and a phase memory time greater than 0.1 seconds substantially filling said containers, a pair of coils one wound around each container, a source of electrical potential selectively connecting with said coils for applying a polarizing voltage to said substance whereby at least a part of the magnetic moments of the signal nuclei are oriented transversely of the earth's magnetic field to cause precession of the nuclei, amplifier means selectively connecting with said coils for amplifying the signals induced into the coils by precession of the nuclei, mixer means coupled to said amplifier means and combining the amplified signals, and a beat frequency detector connecting with said mixer means and providing an indication of magnetic field gradient in response to the mixer means output.

11. A device for detecting magnetic field gradients comprising, two pair of dielectric containers of substantially the same size and shape, frame means supporting said containers in a spaced relationship, a substance having a large number of signal nuclei per unit volume substantially filling said containers, a coil wound around each container, a source of electrical potential, switch means selectively connecting said source of electrical potential alternately with first one pair of the coils and then the other pair of coils for applying a polarizing voltage to the substance in the associated containers whereby at least a part of the magnetic moments of the signal nuclei are oriented transversely of the earth's magnetic field to cause precession of the nuclei, and a beat frequency detector coupled to each of the two pair of coils alternately through said switch means on a time sharing basis with said source of electrical potential for comparing the frequency of the signals induced into the coils by precession of the polarized nuclei to provide an indication of a magnetic field gradient.

12. A magnetic homing device comprising, a pair of dielectric containers of substantially the same size and shape, frame means supporting said containers in a spaced relationship for controlled swinging movement in at least one plane, a substance having a large number of signal nuclei per unit volume and a phase memory time greater than 0.1 seconds substantially filling said containers, a coil wound around each container, switch means connecting with said coils, a source of electrical potential connecting with said switch means for selectively applying a polarizing voltage to said substance through said coils whereby at least a part of the magnetic moments of the signal nuclei are oriented transversely of the earth's magnetic field to cause precession of the nuclei, a frequency comparator selectively connecting with said coils through said switch means for receiving signals induced into the coils by precession of the nuclei and providing an output signal representing the difference in magnetic field strength, and servo-drive means responsive to the output from said comparator means and operatively connecting with the container supporting frame means to angularly position said containers for minimizing the magnetic field gradient.

13. A device for detecting magnetic field gradients comprising, a pair of masses providing two separate atomic spin systems, each having a net magnetic moment and an angular momentum which may be polarized to become oriented at least in part transversely of the earth's magnetic field to cause precession of the spin systems, means detecting the precession of the spin systems, means responsive to the last mentioned means and mixing the precessional signal from each of the masses, means indicating the beat note resulting from the presence of a magnetic field gradient, and means multiplying the precessional frequency from each mass to increase the beat note frequency.

14. A device for indicating the direction of a body of magnetic character comprising, a pair of masses providing two separate spin systems each having a net magnetic moment and an angular momentum, means for applying a polarizing influence to said spin systems for orientation thereof at least in part transversely of the earth's magnetic field, means to remove said polarizing influence to cause precession of the spin systems, means mixing the precessional signal from each of the masses, comparator means responsive to the last mentioned means and indicating a beat note resulting from the presence of a magnetic field gradient, and servo-drive means responsive to said comparator means and positioning said two masses to maintain a substantially zero beat note frequency.

References Cited in the file of this patent

UNITED STATES PATENTS

| | | |
|---|---|---|
| Re. 23,769 | Varian | Jan. 12, 1954 |
| 2,423,103 | Koechlin | July 1, 1947 |
| 2,589,494 | Hershberger | Mar. 18, 1952 |
| 2,720,625 | Leete | Oct. 11, 1955 |
| 2,856,579 | Packard | Oct. 14, 1958 |
| 2,929,018 | Varian | Mar. 15, 1960 |

FOREIGN PATENTS

| | | |
|---|---|---|
| 727,129 | Great Britain | Mar. 30, 1955 |